July 13, 1943.  D. R. HULL  2,324,397
METHOD FOR PRODUCTION OF CONTINUOUS STRUCTURES
Filed June 4, 1941   3 Sheets-Sheet 2
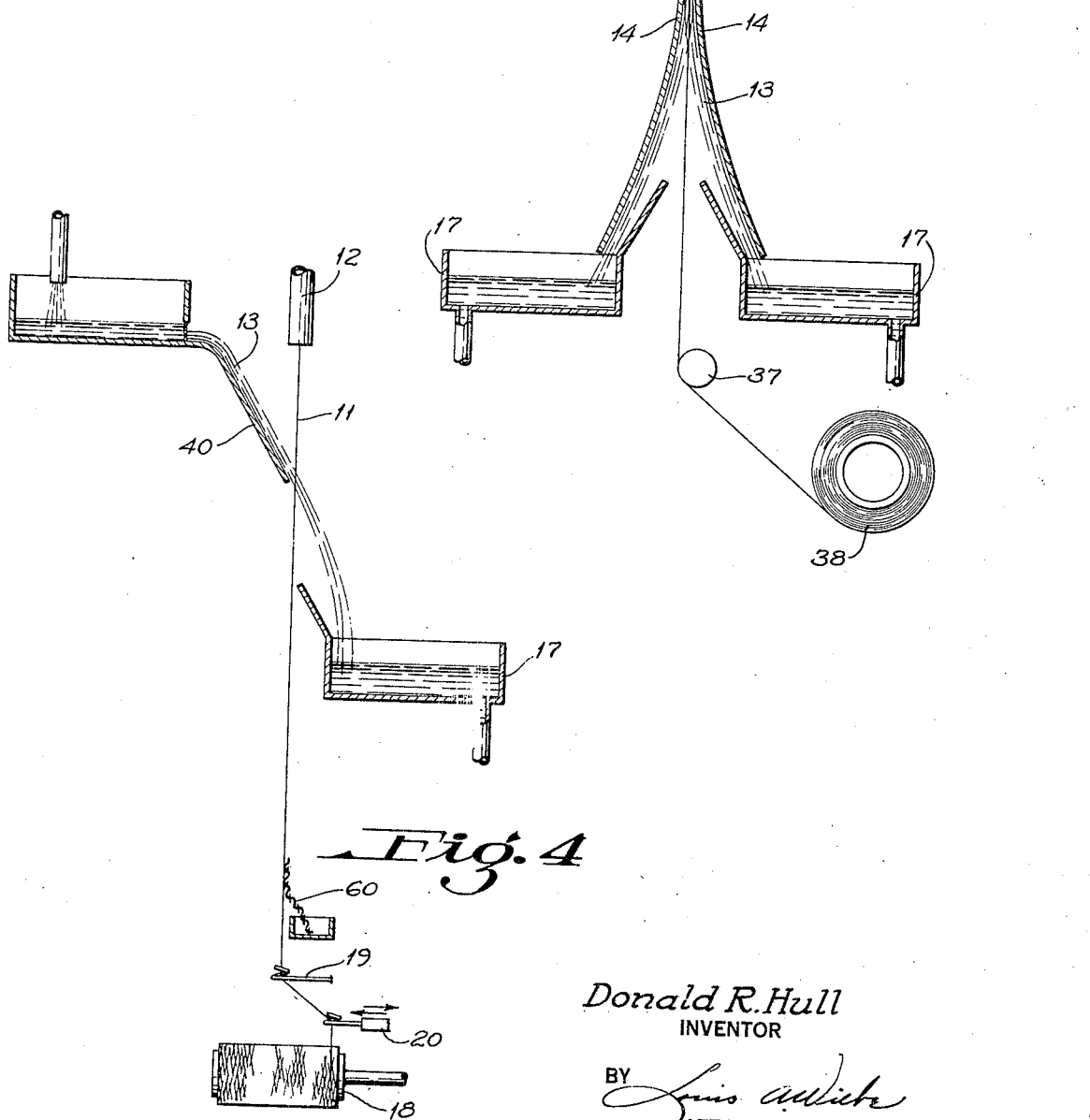
Donald R. Hull
INVENTOR July 13, 1943.  D. R. HULL  2,324,397
METHOD FOR PRODUCTION OF CONTINUOUS STRUCTURES
Filed June 4, 1941  3 Sheets-Sheet 3
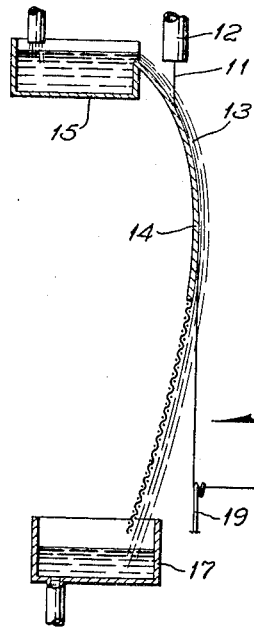
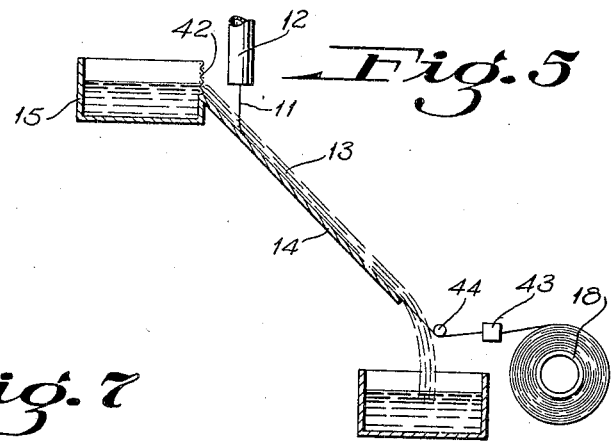
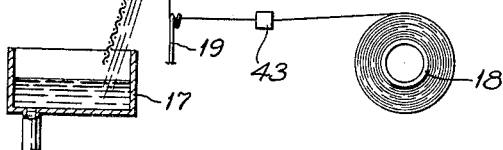
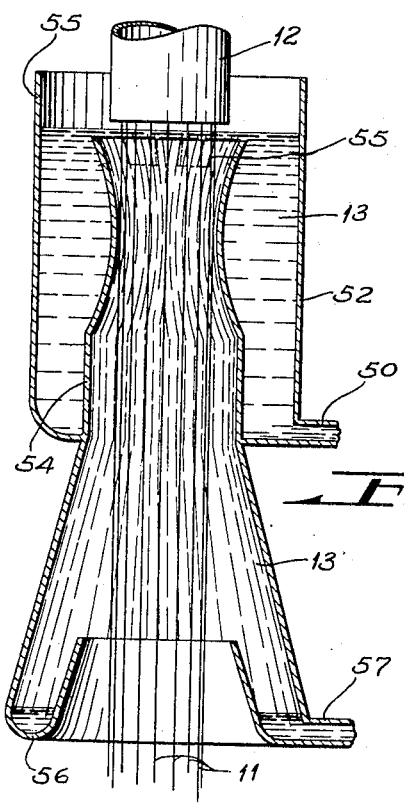
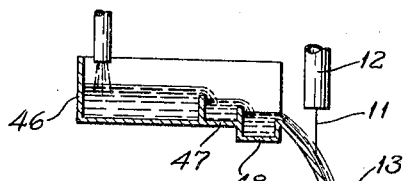
Donald R. Hull
INVENTOR
BY
ATTORNEY Patented July 13, 1943

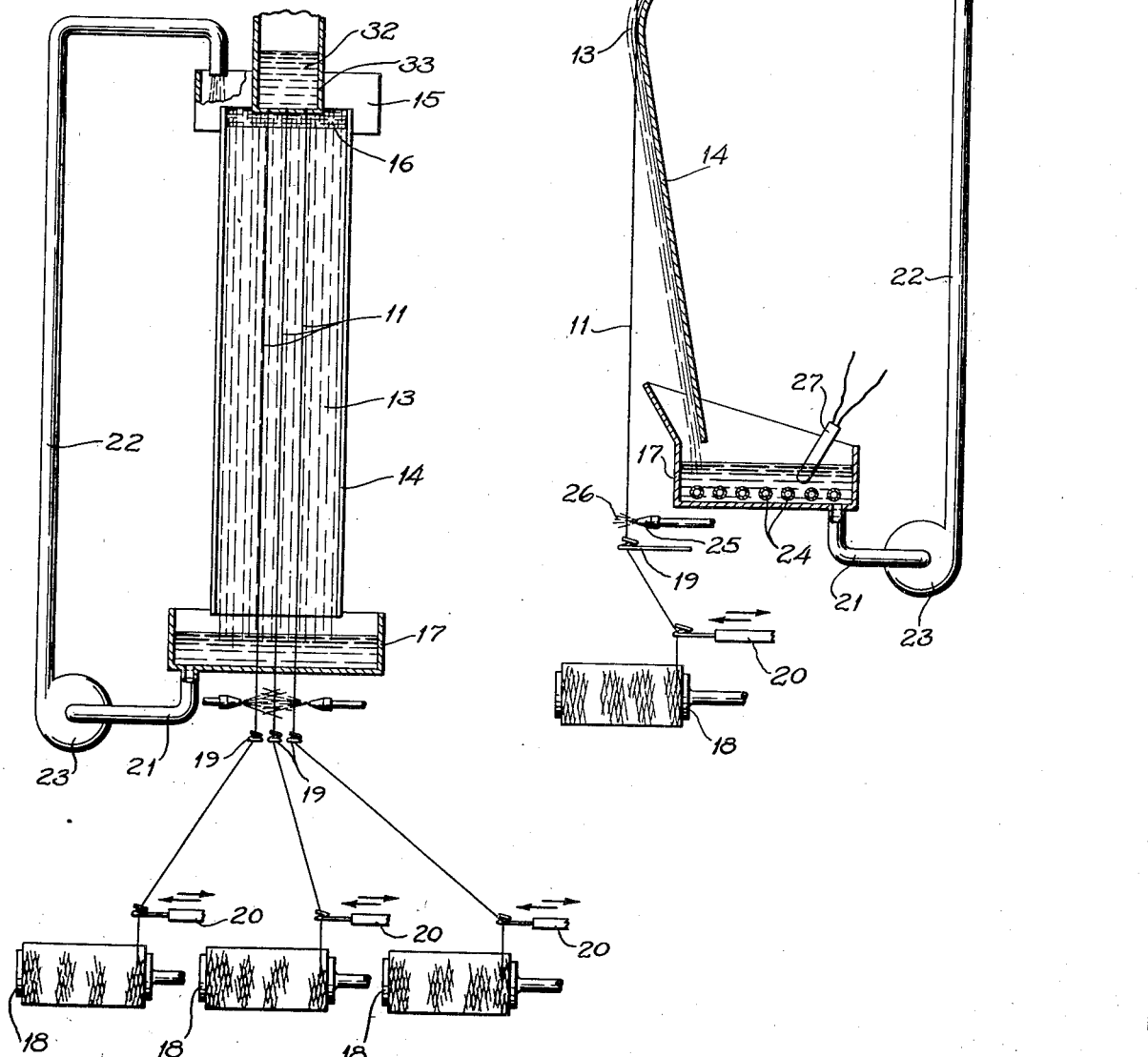

2,324,397

UNITED STATES PATENT OFFICE 2,324,397

METHOD FOR PRODUCTION OF CONTINUOUS STRUCTURES

Donald R. Hull, Newport, Del., assignor to E. I. du Pont de Nemours & Company, Wilmington, Del., a corporation of Delaware Application June 4, 1941, Serial No. 396,524

9 Claims. (Cl. 18—54)

This invention relates to the production of filaments, films, sheets, foils, tubes, and other formed structures from molten organic filament- and film-forming compositions and more particularly, it relates to an improved method for the production of such formed structures. The improved method of the present invention has been found to be particularly applicable to the production of structures from molten compositions comprising fiber-forming synthetic linear polymers. For convenience and simplicity, the present invention will be described with particular reference to the melt extrusion of fiber-forming synthetic linear polymers.

By the term, "fiber-forming synthetic linear polymers," is meant the new polymeric materials described in U. S. Patents Nos. 2,071,250, 2,071,253, 2,130,948 and 2,212,772. Of these polymers, the polyamides described in the last three mentioned patents are the most useful. These fiber-forming polyamides are high molecular weight products which are capable of being cold drawn into fibers showing, by characteristic X-ray patterns, molecular orientation along the fiber axis.

As described in U. S. Patent No. 2,212,772, the embrittling effect of air on freshly melt-extruded synthetic linear polymer articles can be very materially overcome by rapidly cooling or quenching a hot fiber-forming synthetic linear polymer in predetermined shape with a liquid which has no appreciable solvent action on the polymer under the conditions of operation. In accordance with the process of the above-said patent, the hot, extruded structure, while still in the molten state, or immediately after solidification, is contacted with a spray of, or plunged into a bath of, the non-solvent quenching liquid. That method of quenching has not been found altogether satisfactory, since the quenched structures do not have uniform physical properties.

It is, therefore, an object of this invention to provide an improved method and apparatus for quenching hot, shaped structures extruded from molten organic film- and filament-forming compositions, particularly from molten fiber-forming synthetic linear polymers.

It is another object of the present invention to provide an improved method and apparatus for quenching hot, shaped structures extruded from molten organic film- and filament-forming compositions, particularly from molten fiber-forming synthetic linear polymers, whereby to form structures having uniform physical characteristics.

Other objects of the invention will appear hereinafter.

The objects of the invention are accomplished by quenching a hot, shaped structure, immediately after being extruded from a molten organic film- or filament-forming composition, by passing the same downwardly into a downwardly flowing continuous body of non-solvent quenching liquid. In its preferred embodiment, a molten synthetic linear polyamide is extruded to form a structure of predetermined shape and, while the structure is still molten, or after it is solidified but still hot, it is passed downwardly into a downwardly flowing continuous body of quenching liquid which has no appreciable solvent action on the polyamide under the conditions of operation. Preferably, the polyamide structure is separated from the body of the quenching liquid without any substantial change in the direction of the path of travel of the structure during its contact with the main body of the quenching liquid.

For the purpose of this invention, a downwardly flowing continuous body of quenching liquid is a liquid passing with substantial continuity, that is, without interruption as in the case of a spray, in a downward direction. In the specification and claims, the word "liquid" is used to designate the quenching liquid, and the extrudable material or extruded product in the liquid state is designated by the term "molten material."

For the purposes of the specification and claims, a "flume" is defined as a surface over which a quenching liquid flows.

The term "quenching" is defined as a process of rapid cooling. The quenching of melt-spun structures results in the formation of solid structures of improved toughness and utility.

By "non-solvent quenching liquid" is meant a quenching liquid which is without objectionable solvent action on the spun structure. Quenching liquids may be used which have a slight etching action, or plasticizing action or other effect as will be more particularly discussed hereinafter.

The invention will be more readily understood by reference to the following detailed description, when taken in connection with the accompanying drawings, in which:

Figure 1 is a side elevational view, with parts shown in section, of one embodiment of apparatus suitable for use in accordance with the present invention.

Figure 2 is a front elevational view, with parts shown in section, of a slightly modified form of apparatus.

Figure 3 is a partially sectioned side elevational view of another modified form of apparatus for quenching melt-extruded sheets, films, ribbons and the like.

Figure 4 is a partially sectioned side elevational view of still another modified type of apparatus.

Figure 5 is a partially sectioned side elevational view of a modified quenching apparatus in which the liquid flows down an inclined plane.

Figure 6 is a partially sectioned side elevational view of a modified form of the apparatus shown in Figure 1.

Figure 7 is a partially sectioned side elevational view of another modified form of the apparatus shown in Figure 1.

Figure 8 is a vertical cross-sectional view of a cylindrical apparatus suitable for use in accordance with this invention.

Referring to Figure 1 of the drawings, reference numeral 11 designates a filament extruded from a molten organic filament-forming composition through spinneret 12. The filament 11 is shown passing into a quenching liquid 13 which is flowing downwardly in contact with a curved surface or flume 14 connected with a reservoir 15 for the liquid. The reservoir has a screened weir 16 through which the liquid flows smoothly. The flume may have side rails to pull out the liquid to a film over the entire surface and to prevent the liquid from spilling over the sides of the flume. The flume 14 curves outwardly and downwardly from the reservoir closely adjacent to the vertical path of travel of the filament and then curves away from the vertical path of travel of the filament so that the body of the liquid follows the contour of the flume and drops into catch pan 17 spaced from the filament. The filament 11 passes through the downwardly flowing liquid substantially tangentially to the flume 14, then out of the main body of the liquid without any change in the path of travel of the filament and is thereafter passed through fixed guide 19 and traverse guide 20 to be wound up on bobbin 18. Instead of passing tangentially to the flume, the filament may for a certain distance follow the arc of the flume. The first point of contact of the filament with the liquid is preferably about 1½ inches from the spinneret, although this distance may vary rather considerably depending upon the polymer that is being quenched. Any liquid adhering to the surface of the filament may be removed prior to winding up by blowing a stream of air 24 from a nozzle 25 across the filament.

The liquid 13 may be recirculated through conduits 21 and 22 and recirculating pump 23. Cooling, or heating, devices, such as coils 24, for the liquid may be placed in the catch pan 17 or in the recirculating system. Also, temperature control devices, such as a thermostatic device 27, may be used to maintain the temperature of the liquid 13 constant. If desired, however, the used liquid may be discarded and fresh liquid introduced into reservoir 15. This may be especially desirable in the case where water is used as the quenching liquid.

Referring to Figure 2, a molten filament-forming polymer 32 is extruded through spinneret 33 forming three filaments 11 which are quenched as they pass through liquid 13, flowing from reservoir 15 through screened weir 16 downwardly in contact with flume 14. The three filaments are wound up on separate bobbins 18. They may, if desired be wound up on the same bobbin in the manner disclosed in Karns U. S. Patent No. 2,139,449. However, it is important that the filaments do not touch one another until they have been sufficiently quenched to avoid sticking together. As in Figure 1, the liquid may be caught in catch pan 17 and either discarded or recirculated.

Referring to Figure 3, a molten organic film-forming composition, such as a fiber-forming synthetic linear polymer 34 is extruded from hopper 35 in the form of a sheet 36 which is quenched as it passes through liquid 13 which is flowing downwardly from two separate reservoirs 15 over two separate flumes 14 arranged so that the sheet 36 is quenched on both sides. The sheet passes about feed roll 37 and is wound up on package 38. Liquid 13 is caught in catch pans 17 and is discarded or recirculated.

Referring to Figure 4, liquid 13 follows the surface of flume 14 to its lower end forming a continuous sheet of liquid which remains continuous (in contrast to a spray) as it cuts across the path of travel of melt-spun filament 11. Filament 11 is quenched as it passes through liquid 13. Liquid 13 is collected in catch pan 17 and discarded or recirculated. An absorbent wick 60 may be placed against the filament to remove residual moisture therefrom. The end of the wick may be placed in a small drip pan if desired.

Referring to Figure 5, liquid 13 overflows from reservoir 15 through screened weir 42 on to inclined plane flume 14. Reservoir 15 is shown with the end connecting to the flume closed at the bottom and screened at the top so that liquid is fed to the flume by overflowing through the screened part of the end of reservoir 15. This is in contrast to the design of Figures 1 through 4, in which the screened part of the weir is at the bottom and is of fine enough mesh to cause a head of liquid to build up in reservoir 15. The quenched filament 11 is drawn from the liquid by passing the same over guide 44 and is guided on to bobbin 18 by the reciprocating traverse guide 43.

Referring to Figure 6, a cascade effect of the liquid 13 is obtained by means of stepped reservoirs 46, 47 and 48. Liquid overflows from reservoir 46 into auxiliary reservoir 47, then into auxiliary reservoir 48, and then on to flume 14. Thus, the liquid may be air-cooled and thoroughly agitated to maintain the same at uniform temperature. Filament 11 is shown in contact with the liquid on flume 14 for a longer path of travel than in some of the other devices illustrated. Filament 11, after being quenched, passes through guide 19 and is wound up on bobbin 18 with the aid of reciprocating traverse guide 43.

Referring to Figure 7, liquid 13 overflows from reservoir 15 without passing through a screen. Flume 14 is constructed of an unperforated curved solid structure from the point of contact with reservoir 15 to a point just below where the filament becomes separated from the flume. At this point a wire screen or perforated metal section is attached to conduct the liquid with less splashing or spilling off as it flows downwardly into catch pan 17. The quenched filament 11 is drawn away from the liquid by passing the same over fixed guide 19, and is wound on bobbin 18 with the aid of traverse guide 43.

Referring to Figure 8, the quenching liquid 13 enters through intake conduit 50, fills reservoir 52 to the top of flume 54, and overflows forming an annular stream of downwardly flowing liquid on the surface of flume 54 which is circular in horizontal cross-section. If desired, the top peripheral surface of flume 54 may be provided with notched weirs as shown by dotted lines at 55. Filaments 11 are spun by extruding a molten organic filament-forming composition through a spinneret 12 having holes located on the circumference of a circle so that the filaments 11 pass downwardly in contact with the circular flume 54 and through the annular stream of liquid overflowing on to the surface of the circular flume. The filaments are quenched by contact with the liquid and are conducted through the apparatus and wound on one or more bobbins as a yarn or as separate filaments. The quenching liquid flows down the flume surface and collects in trough 56, then drains off through exit conduit 57 to be discarded or recirculated as the case may be.

The following detailed examples illustrate certain methods whereby filaments or sheets may be quenched in accordance with the present invention. These examples are illustrative and are not to be taken as limitative of the details of the invention.

Example I

Molten polyhexamethylene adipamide filaments were spun from melt at 285° C. at 800 feet per minute and quenched in an apparatus such as shown in Figure 8. Ten filaments having an average spun denier of 17 per filament were extruded from a spinneret having 10 holes equally spaced on the circumference of a circle ⅝ inch in diameter. The filaments entered the quenching liquid, water, ¾ inch below the spinneret. The water, tap water having a temperature of about 50° F., was fed into the quenching apparatus sufficiently rapidly to maintain the level of the water about 1/16 inch above the overflow edge of the flume 54. The filaments passed through the water for a distance of approximately 3½ inches. The filaments were subsequently collected and wound up as a 170-denier yarn. The same procedure is operable at higher spinning speeds, for example, 2,000 feet per minute.

Example II

A 770-denier monofil was spun from molten polyhexamethylene adipamide and quenched in tap water flowing in a flume similar to that shown in Figure 7 except that it had no wire screen section. The flume was 36 inches long, 1½ inches wide, and had side rails ⅛ inch high. Sufficient water was fed to the weir at the top of the flume, from a constant level tank, to keep the flume running full. The monofil entered the water about ½ inch below the spinneret and traveled about 30 inches in the quenching liquid before being separated from it and was wound up at 500 feet per minute.

The filaments spun in accordance with the above examples are much tougher and more pliable than similar filaments spun without quenching. Furthermore, the physical characteristics of the filaments are much more uniform along their length than those of similar filaments quenched by plunging the same into a bath or by spraying the same with a quenching liquid.

The drawings show several different modifications of apparatus which may be used in practicing this invention. However, the invention is not limited to these specific forms of apparatus. Numerous other designs of apparatus may be used to quench freshly melt-spun synthetic linear polymers or other melt-spun materials by means of a downwardly flowing liquid.

It is rather important that the flume pass relatively close to the spinneret in order to prevent too long a travel of the extruded structure through the air prior to its contacting the quenching liquid. The permissible distance will vary from one material to another, and will depend to a certain extent on the size of the structure being extruded. In general, for fairly heavy denier filaments, for example, 150 spun denier or greater, it has been found preferable to arrange for the filaments to contact the downwardly flowing quenching liquid within ½ to 2 inches of the spinneret. In some cases, greater distances from the spinneret to the quenching liquid may be permitted provided the filaments suffer no harmful effect from contact with air. Generally speaking, the shorter the distance between the spinneret and the quenching liquid, the better the product will be; but, of course, the proximity of the spinneret to the quenching liquid will very largely depend on the design of the apparatus. Even shorter distances than ½ inch may be practical in certain designs. However, it is important that the quenching liquid does not approach so close to the spinneret as to cause an undesirable cooling of the spinneret. For this reason, it is important that the flow of the quenching liquid be smooth so as to avoid splashing, particularly when the liquid is close to the spinneret. The extruded structures may still be in the molten state when they contact the flowing quenching liquid, or they may have solidified, or partially solidified, in the atmosphere before coming into contact with the liquid. The temperature of the extruded structure, when brought in contact with the quenching liquid, must be in proximity to its melting point. The minimum temperature of the structure when subjected to quenching will, of course, vary in accordance with the melting point of the composition of which the structure is composed. In order to obtain best results, it is preferred that the structure, when subjected to quenching, have a temperature not to exceed 25° C. below its melting point.

The flume may have any desired shape, inclination or radius of curvature, it being only necessary that the quenching liquid be conducted in a continuous body without substantial splashing or spraying.

The liquid used to quench the material should preferably be substantially chemically inert toward the material and should not have an appreciable solvent action thereon under the conditions of quenching. Water meets these requirements with respect to a large number of materials and in addition, is readily available and has a high specific heat. It is, therefore, the preferred quenching medium. However, a large variety of other liquids may be employed. As examples, might be mentioned alcohols, ketones, ethers, esters, hydrocarbons, chlorinated hydrocarbons, and solutions of such compounds which will have no appreciable solvent action on the material being quenched. The use of lower alcohols, such as methanol or ethanol will produce dull filaments apparently due to the etching of the filament surfaces by the slight solvent action of these quenching liquids. The quenching liquid may consist of a mixture of compounds. Even materials such as phenols or formic acid which, in the pure state or in concentrated solution, are solvents for polyamides may be employed in the form of dilute solutions in relatively inert liquids. For example, dilute aqueous solutions of phenol or of formic acid which have only a mild swelling action of polyamides may be used as quenching liquids. Such a combination of two or more materials to make up the quenching liquid may be employed to accomplish other purposes than quenching simultaneously with the quenching operation or may be used to prepare the filaments for some subsequent treatment. For example, a textile finish may be used as the quenching liquid and thus eliminate the separate application of textile finish. It may also contain wetting agents, dyes, oils, and other materials either dissolved in it or dispersed in it for various purposes.

The quenching liquid is ordinarily employed at ordinary temperatures; i. e., temperatures at which such liquid is readily available, for example, tap water without cooling or heating. The quenching liquid, however, may be cooled by means of brine or other suitable means to subnormal conditions, for example, close to the freezing point of water or even lower in case the liquid, for example water, has a material dissolved in it to lower its freezing point. By this means a larger temperature differential between the extruded material and the quenching liquid may be readily obtained. In general, the greater the temperature differential between the extruded material and the quenching liquid, the better the product will be so long as the material is not deteriorated by the sudden cooling. For practical purposes and for economy, it is generally undesirable to cool the quenching liquid below ordinary temperatures. The temperature differential obtainable will, of course, depend on the temperature of the extruded molten material which in turn will depend on the melting point of the material. It is also within the scope of the invention to use the quenching liquid at moderately elevated temperatures, for example 50° to 100° C., providing there is a sufficient temperature differential. The temperature of the quenching liquid should preferably be kept below 100° C. If desired, the temperature of the quenching liquid may be kept constant by any suitable means, for example, by use of a thermostatic temperature control device. The quenching liquid may be recirculated or it may be discarded after a single quenching.

The rate of flow of the quenching liquid will depend on the particular apparatus being used and on the physical properties of the quenching liquid and the structure to be quenched. The thickness of the film of quenching liquid on the flume will depend on the physical properties of the quenching liquid and may be controlled by the weir or other means for feeding the quenching liquid to the flume. In general, it is desirable that the film of quenching liquid on the flume be at least the thickness of the filaments or other structures being quenched.

The number of filaments which can be quenched on a single flume will, of course, depend on the design of the flume and on the size and spacing of the filaments. It is impracticable to try to quench so many filaments at a time as to cause the filaments to strike one another whereby fusing of the filaments may occur.

It is possible to spin and quench very heavy denier filaments in accordance with this invention. The maximum denier filaments which can be spun will depend on the particular material. In general, it is impracticable to spin a filament of such a great denier that it falls away from the spinneret, by reason of the pull of gravity, more rapidly than it is extruded. Beyond this, there appears to be no upper limit to the denier of filaments which may be quenched in accordance with this invention. There is no lower limit to the denier of filaments which may be prepared in accordance with the invention other than the finest denier filament that can be melt-spun from a given material. However, in the case of polyhexamethylene adipamide the invention is particularly advantageous for the preparation of filaments of greater than 150 spun denier since it is impracticable to quench such large filaments of that polyamide in air.

The spinning speeds which may be used in preparing filaments in accordance with this invention are limited only by the characteristics of the apparatus and the polymer being spun.

Although the invention has been described with particular reference to polyamides, it is broadly applicable, as above indicated, to all liquid quenchable, melt-extruded structures of organic compositions and particularly to liquid quenchable structures of fiber-forming synthetic linear polymers. As examples of such polymers might be mentioned fiber-forming synthetic linear polyesters, polyethers, polyacetals, polyester-polyamides and other fiber-forming synthetic linear copolymers or interpolymers. Fiber-forming polymers prepared by the high pressure polymerization of ethylene, which are more fully described in British Patent No. 471,590, may also be melt-spun and quenched in accordance with this invention. It is to be understood that the aforementioned examples are illustrative merely as to the manner of carrying out the practical applications of this invention. The process has been described with particular reference to polyamides because they form an especially useful class of polymers. A valuable class of polyamides for use in accordance with this invention comprises those derived from diamines of the formula $NH_2CH_2RCH_2NH_2$ and dicarboxylic acids of formula

$HOOCCH_2R'CH_2COOH$ and amide-forming derivatives of these reactants, R and R' in said formulae representing divalent hydrocarbon radicals free from olefinic and acetylenic unsaturation and R having a chain length of at least two carbon atoms. An especially valuable group of polyamides within this class are those in which R is $(CH_2)_x$ and R' is $(CH_2)_y$ wherein $x$ and $y$ are whole numbers and $x$ is at least 2. As examples of polyamides which fall within one or both of these groups might be mentioned polytetramethylene adipamide, polytetramethylene suberamide, polytetramethylene sebacamide, polypentamethylene sebacamide, polyhexamethylene adipamide, polyhexamethylene beta-methyl adipamide, polyhexamethylene sabacamide, polyoctamethylene adipamide, polydecamethylene adipamide, polydecamethylene para-phenylene diacetamide, and poly-p-xylylene sebacamide.

This invention is also of importance in connection with synthetic linear polyamides derived from monoaminomonocarboxylic acids and their amide-forming derivatives. As examples of such polyamides might be mentioned those derived from 6-aminocaproic acid, 9-aminononanoic acid, and 11-aminoundecanoic acid. It is also within the scope of this invention to quench mixtures of polyamides or interpolymers or copolymers; i. e., polyamides prepared from a mixture of polyamide-forming reactants, for example, a mixture of two or more diamines with one or more dicarboxylic acids, or a mixture of a diamine, a dicarboxylic acid, and an amino acid. Melt blends of separate preformed polyamides; i. e., two or more separately prepared polyamides which have subsequently been brought together and heated for an appreciable time in the presence of each other at or above their melting temperatures, may be melt-spun and quenched in accordance with this invention.

This invention is not limited to the quenching of polyamides and polyamide articles consisting solely of fiber-forming linear polyamides. Other materials, such as plasticizers, melting point depressors, for example, orthohydroxydiphenyl and diphenylolpropane, pigments, extenders, fillers, dyes, resins, oils, cellulose derivatives, and the like, may be present in addition to the polyamide. Thus, a quenched polyamide filament containing 0.3% titanium dioxide as a delusterant is tougher and more pliable than an unquenched filament of the same composition. To the extent that the material is present in moderate amounts, it does not interfere with the beneficial effects of the quenching operation.

It will be evident from the foregoing discussion that this invention provides a simple and economical method for improving the properties of synthetic linear polyamides. Application of this invention yields a tough, strong, and pliable polymer which has many applications in the art. The invention is particularly useful in the preparation of large polyamide filaments, bristles, films, sheets, ribbons, foils, tubes, coatings, for example, wire coatings, and the like. The invention makes possible the spinning of filaments of such heavy denier that they could not be spun using air quenching alone. For instance, a filament might be made too large to support itself against gravity if forced to fall through air for a long enough time to cool sufficiently to be wound up; whereas, the same filament might be spun and quenched in accordance with this invention. Similarly, certain materials may be so susceptible to the harmful effects of air that they could not be spun into air to produce a practical product, although they may be successfully spun and quenched in accordance with this invention to produce useful articles.

An outstanding advantage of this invention over the process of quenching by extrusion into a bath of a quenching liquid is that the positive circulation of the quenching liquid obtainable in accordance with the present invention insures excellent heat transfer and permits higher spinning speeds than are practicable with liquid bath quenching. The filaments are quenched more uniformly because the conditions of the quenching liquid may be more uniformly controlled with respect to the spun structure than in the case of bath quenching. Furthermore, the operation is always visible and thus can be better controlled than bath quenching. Also the apparatus is, in general, more readily accessible and as a consequence more easily threaded up than a bath quenching apparatus. The special requirements for the equipment needed to produce a given amount of extruded and quenched product are less than for bath quenching equipment to produce the same amount. Accordingly, the cost of construction and operation is less for this type of quenching apparatus.

The invention is particularly useful for the preparation of large filaments to be used as bristles, horse hair substitutes, mohair substitutes, tennis strings, musical instrument strings, surgical sutures, fish line leaders, dental floss, and the like. However, the invention is also very helpful in the preparation of medium sized filaments such as are particularly useful in the preparation of monofil stockings, monofil woven fabrics, for example substitutes for metallic screens, belting, parachute cloth, and filaments to be used as a reinforcing material, for example, in the selvage of a woven fabric or as reinforcement for a motion picture film, or the like.

Since it is obvious that many changes and modifications can be made in the details above-described without departing from the nature and spirit of the invention, it is to be understood that the invention is not to be limited to those details except as set forth in the appended claims.

I claim:

1. The method of quenching a hot structure extruded from a molten organic structure-forming composition which comprises passing said structure, after extrusion and while still having a temperature in proximity to its melting point, downwardly into a downwardly flowing continuous body of quenching liquid, said liquid being substantially chemically inert to said structure during the said quenching operation.

2. The method of quenching a hot structure extruded from a molten organic structure-forming composition which comprises passing said structure, after extrusion and while still having a temperature within 25° C. of its melting point, downwardly into a downwardly flowing continuous body of quenching liquid, said liquid being substantially chemically inert to said structure during the said quenching operation.

3. The method of quenching a hot structure extruded from a molten organic structure-forming composition which comprises passing said structure, after extrusion and while still having a temperature in proximity to its melting point, downwardly into a downwardly flowing continuous body of quenching liquid having a substantially constant temperature.

4. The method of quenching a hot structure extruded from a molten organic structure-forming composition which comprises passing said structure, after extrusion and while still having a temperature in proximity to its melting point, downwardly into a downwardly flowing continuously body of quenching liquid maintained at a substantially constant temperature below 100° C.

5. The method of quenching a hot structure extruded from a molten organic structure-forming composition which comprises passing said structure, after extrusion and while still having a temperature in proximity to its melting point, downwardly into a downwardly flowing continuous body of water.

6. The method of quenching a hot structure extruded from a molten organic structure-forming composition which comprises passing said structure, after extrusion and while still having a temperature in proximity to its melting point, downwardly into a downwardly flowing continuous body of water having a substantially constant temperature.

7. The method defined in claim 1 in which the molten composition and the resulting extruded structure are essentially composed of a synthetic linear polymer.

8. The method defined in claim 1 in which the molten composition and the resulting extruded structure are essentially composed of a synthetic linear polyamide.

9. The method of quenching a hot structure extruded from a molten organic structure-forming composition which comprises passing said structure, after extrusion and while still having a temperature in proximity to its melting point, downwardly into a downwardly flowing continuous body of quenching liquid, said liquid being substantially chemically inert to said structure during the said quenching operation, and separating said structure from said liquid while maintaining the direction of travel of the structure substantially the same as its direction of travel during the contact with the liquid.

DONALD R. HULL.